United States Patent [19]
Shiomi

[11] Patent Number: 6,122,448
[45] Date of Patent: Sep. 19, 2000

[54] IMAGE BLUR PREVENTION APPARATUS

[75] Inventor: Yasuhiko Shiomi, Tokyo, Japan

[73] Assignee: Canon Kabushiki Kaisha, Tokyo, Japan

[21] Appl. No.: 08/698,147

[22] Filed: Aug. 15, 1996

[30] Foreign Application Priority Data

Aug. 21, 1995 [JP] Japan .................................. 7-233188

[51] Int. Cl.[7] .............................................. G03B 17/00
[52] U.S. Cl. ............................................................ 396/55
[58] Field of Search ................................ 396/55, 53, 52; 348/208; 359/554–559

[56] References Cited

U.S. PATENT DOCUMENTS 4,965,619  10/1990  Shikaumi et al. ......................... 396/55
5,335,032   8/1994  Onuki et al. .......................... 396/53 X Primary Examiner—W. B. Perkey
Attorney, Agent, or Firm—Fitzpatrick, Cella, Harper & Scinto

[57] ABSTRACT

An image blur prevention apparatus includes a movable member (e.g., a correction optical system) which moves for image blur prevention, a holding device (e.g., a locking member for holding the correction optical system) which holds the movable member, the holding device being changeable between a state in which a predetermined holding operation is performed and a state in which the predetermined holding operation is not performed, an operating device which operates the movable member for image blur prevention (e.g., operates the correction optical system in accordance with an image blur signal) at a predetermined position as a control center position (e.g., a position at which the optical axis of the correction optical system matches another optical axis), and a control device which controls movement of the movable member between the position at which it is held by the holding device and the predetermined position, and which controls a process of the movement between the holding position and the predetermined position.

49 Claims, 12 Drawing Sheets

IMAGE BLUR PREVENTION APPARATUS

BACKGROUND OF THE INVENTION

1. Field of the Invention

The present invention relates to an image blur prevention apparatus that prevents the occurrence of blurred images when a camera or other optical devices are used.

2. Related Background Art

The conventional structure of an image blur prevention apparatus that is used for a camera, etc., is shown in FIG. 12. In accordance with the state of a switch 52, through a lock driving means 61, a control circuit 51, for controlling the entire apparatus, operates a lock mechanism 62 that mechanically locks and, in order to begin an image blur prevention operation, releases the lock of a correction system 59.

At the same time as this operation is being performed, the output, transmitted through a high pass filter 55 and an integral means 56, of a fluctuation sensor 54, which detects the movement of the hands of an individual, such as a photographer, who operates an optical device; the output of a correction system position detection means 60, which detects the positional shifting of a correction system 59; and the output of a driving center setting means 50, which sets a driving center by employing data it receives from an adjusted data setting means 63, are added together by an addition means 57 and the result is input to a correction system driving means 58. Then, the output of the correction system driving means 58 is employed to drive the correction system 59, which is provided in one part, or in front, of an exposure system.

Therefore, under the previously described feedback control for the correction system, as long as the phase of movement and the sensitivity of the correction system are set (i.e., an output at a unit correction angle), the positioning of the correction system, which is determined by the output of the fluctuation sensor 54 and the output of the driving center setting means 50, can be instantaneously adjusted, so that the blurring of an image, which can accompany the movement of the hands of an operator, can be expeditiously avoided.

In the prior art, however, the locking mechanism for the correction system is so designed that for a projection that is formed on the locking mechanism, which during the locking process, rapidly engages a recessed portion of the correction system, normally there is a certain amount of play provided by sizing errors that occur during manufacture and because of improvements made to increase the reliability of the locking operation. Therefore, when the control of the correction system 59 is in the OFF state and the correction system 59 is locked, the correction system 59 can be freely shifted within a range of movement that is provided by the play.

FIG. 13 specifically shows the range of movement afforded by the play in the mechanical locking when the correction system 59 is locked. As is shown in FIG. 13, the range of movement for the correction system 59, while it is in the locked state, defines a circle. In order for mechanical/optical positioning to be performed, the correction system is usually so designed that the center of the light axis is at the center of the play in the mechanical locking. A driving center, with which correction is to be performed based on the above-described sensor output, is also intended to correspond with the center of the play in the mechanical locking.

However, the position of the driving center of the correction system 59 differs, depending on the lenses employed, in accordance with the accuracy of the attachment of the correction system position detection means 60 and the offset for circuitry. The data for the individual lenses that are set by the adjusting data setting means 63 are used to provide corrections for correctly positioning the driving center so that its position corresponds with the center of the range of play for the mechanical locking. As was first described, when there is too little available play for the mechanical locking (e.g., the surface area of a recessed portion that is formed in the correction system is reduced), accordingly, the projection that is formed on the locking mechanism may not engage the recessed portion and it may not be possible to lock the correction system. Therefore, a certain amount of play must be provided to insure reliable locking.

If there is too much play in the locked portion, however, when the correction system, which gravity places in the outermost edge of the play before the initial locking is released, is moved to the center of the range of movement of the play at the same time as the locking is released, an image that has passed through the exposure system (to include the correction system) is greatly changed instantaneously, and an operator has a strong sense of incongruity when observing an object through a TTL view finder such as is used in a single-lens reflex camera.

SUMMARY OF THE INVENTION

According to one aspect of the present invention, an image blur prevention apparatus comprises; a movable member which moves for image blur prevention, a holding device which holds the movable member, an operating device which, for image blur prevention operates the movable member at a predetermined position as a control center position, and a control device which controls movement of the movable member between a holding position by the holding device and the predetermined position, wherein the control device controls a process for the movement between the holding position and the predetermined position, whereat the movable member can be appropriately operated when the movable member is to be held or is to be released.

DETAILED DESCRIPTION OF THE PREFERRED EMBODIMENTS (First Embodiment)

The preferred embodiments of the present invention will now be described while referring to the accompanying drawings.

Figure 1:
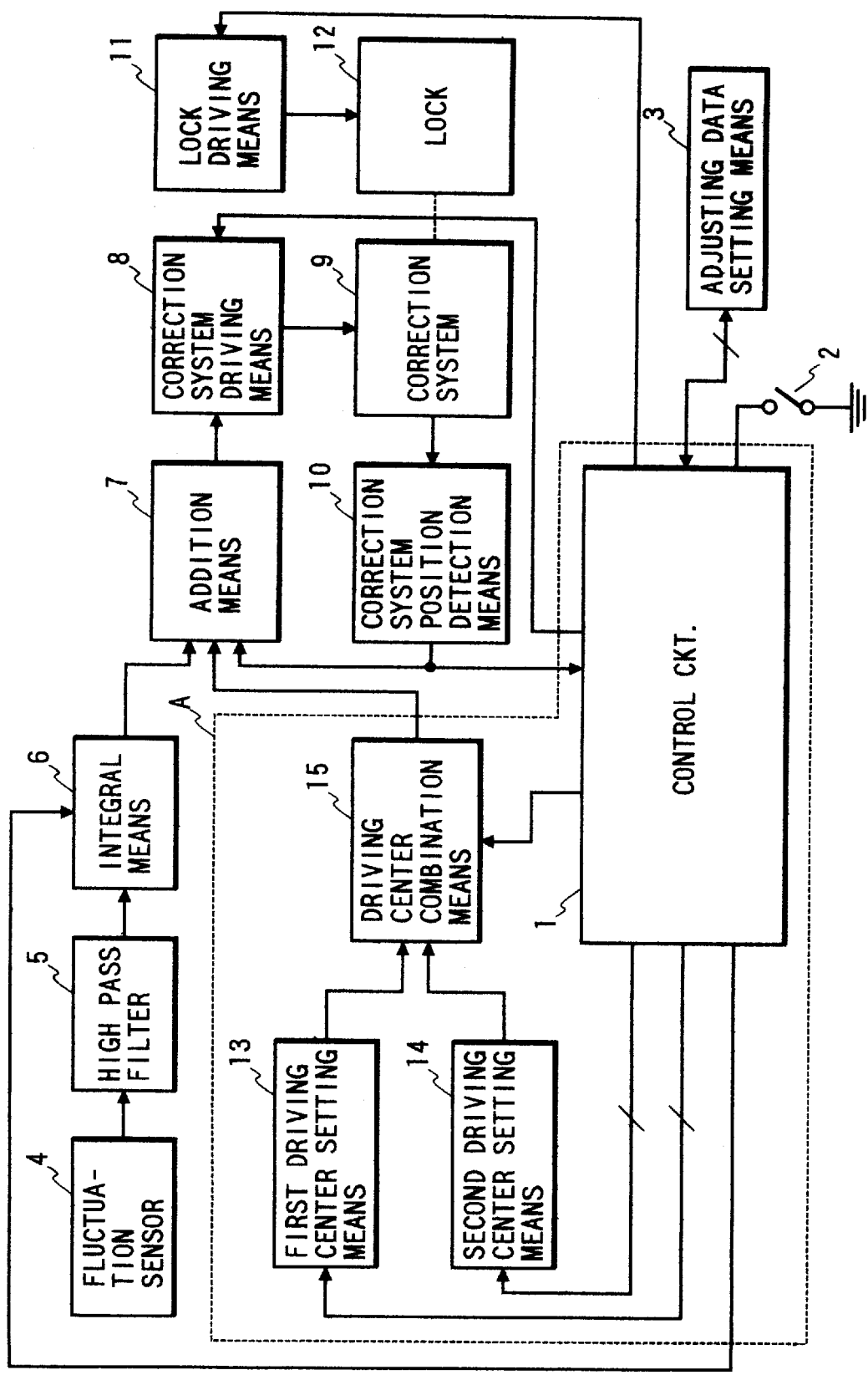
FIG. 1 is a diagram illustrating the general structure of an image blur prevention apparatus according to a first embodiment of the present invention.

FIG. 1 is a diagram illustrating the general structure of an image blur prevention apparatus according to a first embodiment of the present invention. In FIG. 1, a control circuit 1 controls all the operations of the apparatus; switch means 2 is used by a photographer, for example to start and to end the operation performed for image blur prevention; and adjusting data setting means 3 holds data inherent to an apparatus that incorporates the image blur prevention apparatus.

A fluctuation sensor 4 detects vibrations of an entire apparatus, which are caused by the movement of the hands of a photographer, relative to absolute space-time. While the output of the fluctuation sensor 4 is passed through a high pass filter 5 and an integral means 6, which are located at the next stage, unwanted DC components, etc., are removed from the output, and the result is converted into an appropriate fluctuation displacement signal by integral processing. The output of a sensor signal will be specifically explained while referring to FIG. 2.

Figure 2:
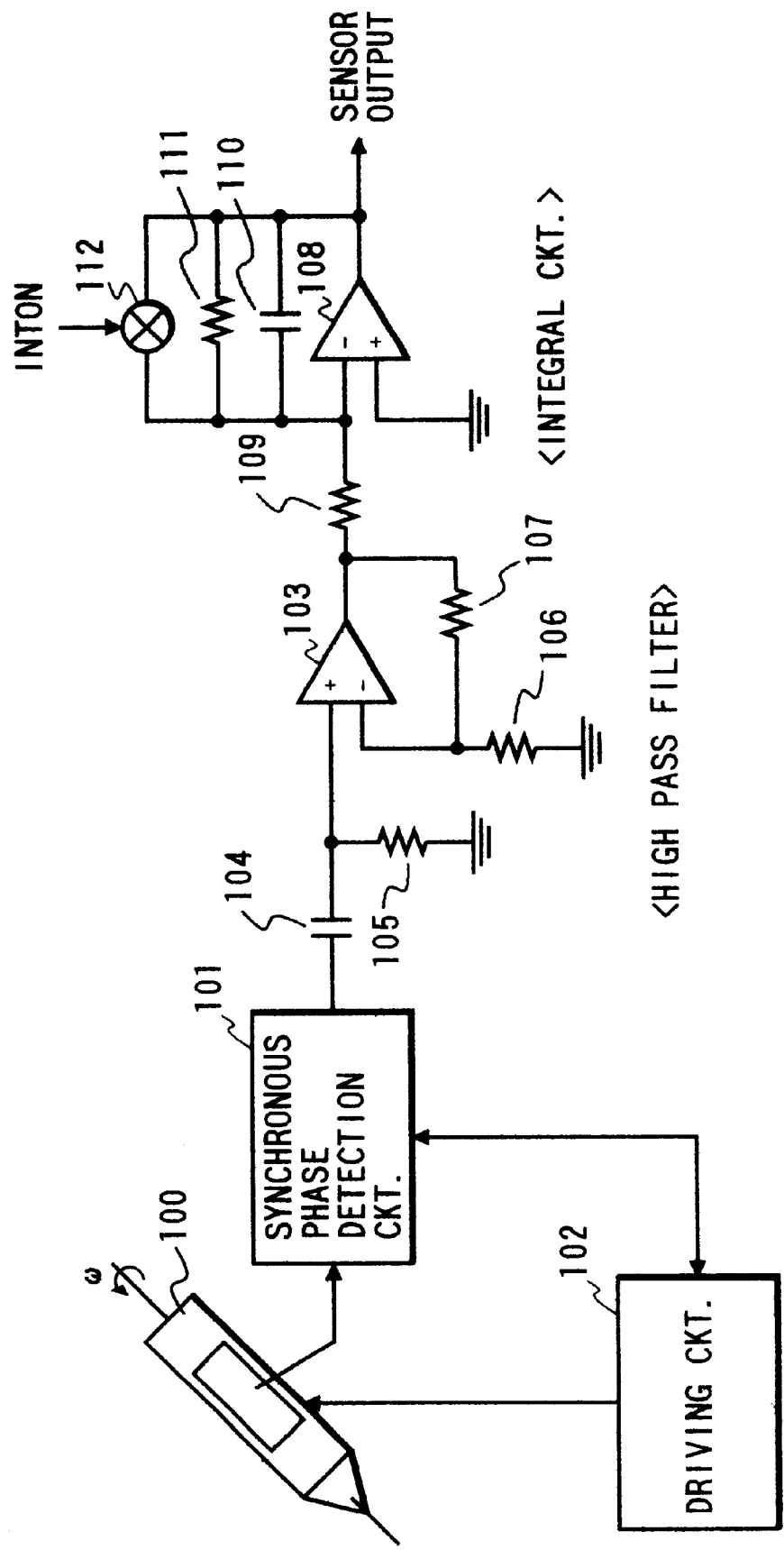
FIG. 2 is a diagram illustrating a circuit for detecting the output of a fluctuation sensor shown in FIG. 1.

FIG. 2 is a diagram illustrating a detection circuit for the output of the fluctuation sensor 4 shown in FIG. 1. FIG. 2 shows a specific circuit for detecting the output of the fluctuation sensor 4, for which a so-called fluctuation gyro that detects an angular velocity is employed.

In FIG. 2, based on a drive signal from a driving circuit 102, an oscillator 100 is driven in resonance with a predetermined frequency/a predetermined amplitude. When, in this condition, rotation angular velocity $\omega$ around the axis acts on the oscillator 100, the output of the oscillator 100 is a result obtained by multiplying a drive frequency signal of the oscillator by the rotation angular velocity $\omega$, i.e., an AM demodulated signal. The demodulated signal is modulated by a synchronous phase detection circuit 101 using a frequency signal that has the same driving/resonance frequency as the oscillator 100, and only a signal that corresponds to the angular velocity $\omega$, which acts on the oscillator 100, is output.

Normally, because of an imbalance, etc., in the oscillator 100, a predetermined voltage output (called a DC offset) appears as the output of the synchronous phase detection circuit 101, even when the angular velocity $\omega=0$. To remove the DC element, connected to the output side is the high pass filter 5, which includes an operational amplifier 103, a capacitor 104, and resistors 105, 106 and 107.

Therefore, the signal elements that have frequencies lower than a cutoff frequency of the high pass filter 5, which is determined by constants for the capacitor 104 and the resistor 105, are removed in the high pass filter 5. An integral value for the output, after it has passed through the high pass filter 5, is obtained by an integral circuit 6, which includes an operational amplifier 108, resistors 109 and 111, and a capacitor 110, and the angular velocity signal is converted into an angle signal. An analog SW 112 is used to short-circuit both ends of the capacitor 110 to alter a time constant of the integral circuit 6, and is controlled by a control signal INTON.

Referring back to the structure in FIG. 1, the final output of the thus obtained sensor signal is input from the integral means 6 to addition means 7. The addition means also receives an output of driving center combination means 15, which transmits final driving center data that are obtained by combining an output of first driving center setting means 13 and an output of second driving center setting means, both outputs being determined based on set data from a control circuit 1, which will be described later.

Further, the addition means 7 receives the output of a correction system position detection means 10, for indicating the current position of a correction system 9, that optically corrects the blurring of an image, which should be in focus through an exposure optical system at a predetermined position, that is caused by the movements of the hands of a photographer.

The output of the addition means 7 is transmitted to correction system driving means 8, and the output of the correction driving means 8 is used for correction by the correction system 9. When the phase of the detected output and the sensitivity (output for each unit of correction angles) of the position of the correction system are properly specified, the feedback control can be so accomplished that the correction system 9 is driven in accordance with the sensor output and the driving center data. When the correction operation is not performed, the correction system 9 is fixed mechanically by a lock 12 that is driven by lock driving means 11.

Figure 3:
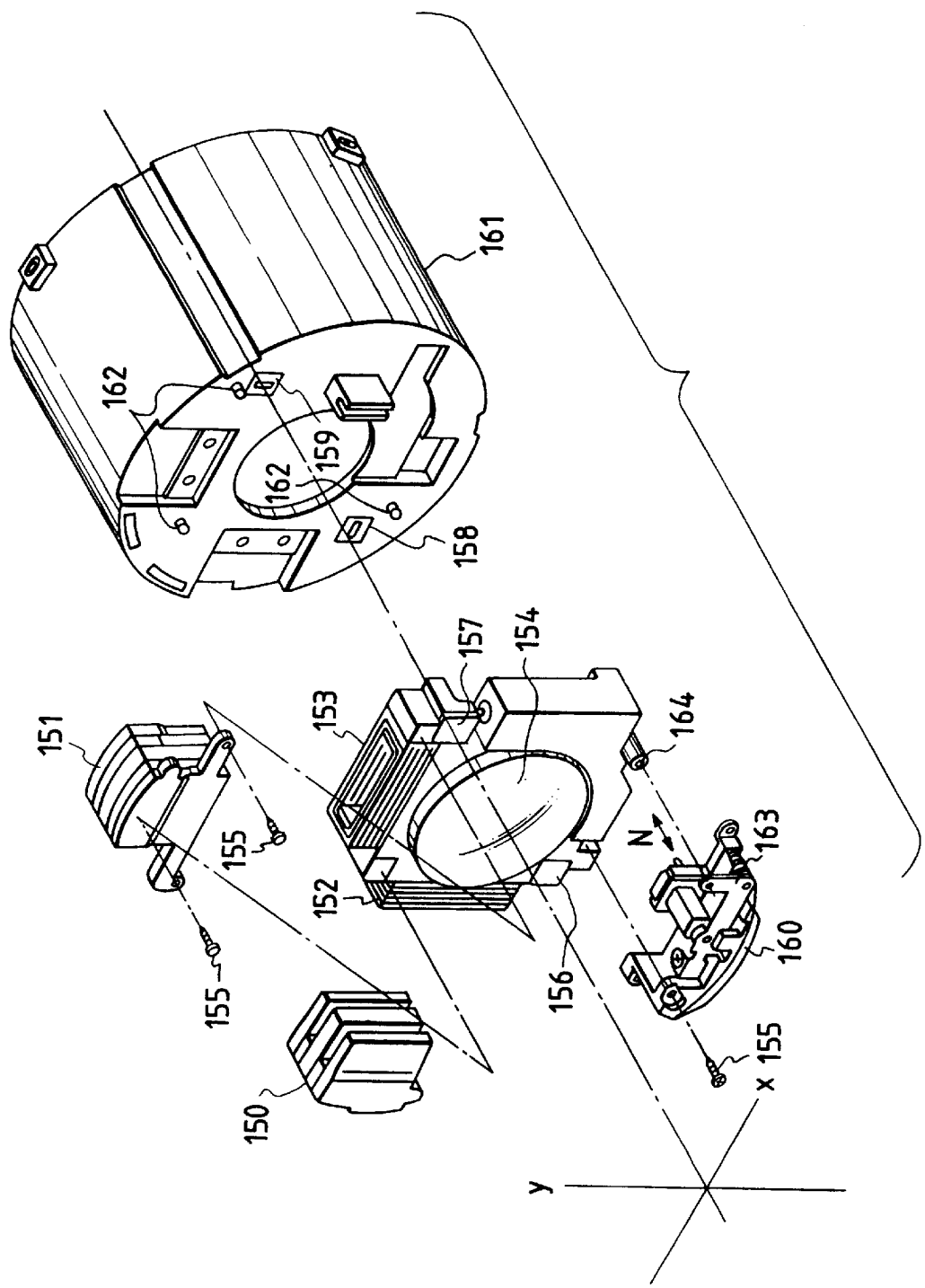
FIG. 3 is a diagram illustrating the essential portion of a correction system shown in FIG. 1.

FIG. 3 is a diagram illustrating the essential portion of the correction system 9 shown in FIG. 1. The structure of a shift correction optical system, wherein one part of a lens group can be freely moved across a plane perpendicular to a light axis, will now be described as the correction system according to this embodiment while referring to FIG. 3.

In FIG. 3, a correction lens system 154, which is one part of an exposure lens system, can be moved to an arbitrary position on a plane perpendicular to a light axis by using a method that will be described later. For movement in the x axial direction, the correction lens system 154 is controlled as desired by a magnetic circuit, which includes a yoke 150 and a magnetic coil 152, in accordance with the strength and the direction of the flow of a current that passes across the magnetic coil 152. Similarly, for movement in the y axial direction, the correction lens system 154 is controlled by a magnetic circuit that includes a yoke 151 and a magnetic coil 153.

The actual movement of the correction lens 154 is optically/electrically detected, without making contact, by a combination of IRED portions 156 and 157, which are moved together with the correction lens 154, and PSDs (Position Sensitive Devices) 158 and 159, which are fitted into a lens barrel 161 that holds the entire shift lens. A specific detection method will be explained while referring to FIG. 4.

Figure 4:
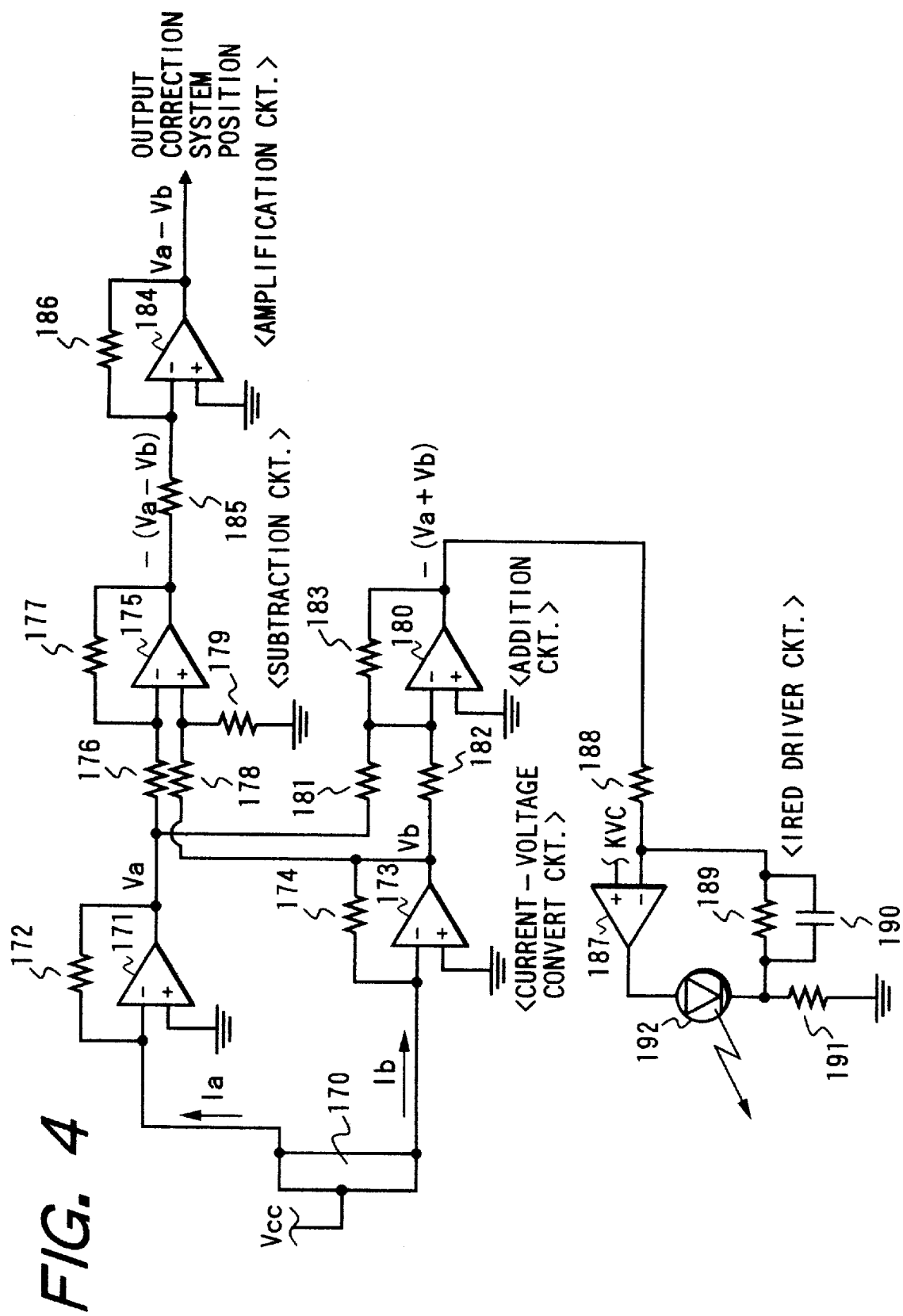
FIG. 4 is a specific circuit diagram illustrating a correction system position detection means shown in FIG. 1.

FIG. 4 is a specific electric circuit diagram illustrating the correction system position detection means 10 shown in FIG. 1. A signal light that is projected by an IRED 192 enters a PSD 170, and in accordance with the incident position of the PSD 170, currents Ia and Ib that are output by the PSD 170 are branched. The current Ia is converted into a predetermined voltage Va by a current-voltage conversion circuit that consists of an operation amplifier 171 and a resistor 172. In the same manner, the current Ib is converted into a predetermined voltage Vb by a current-voltage conversion circuit that consists of an operational amplifier 173 and a resistor 174.

These two voltages are added together by an addition circuit, which includes an operational amplifier 180 and registers 181, 182 and 183, to obtain an output −(Va+Vb). This output is transmitted to an IRED driver circuit that includes an operational amplifier 187 and resistors 188, 189 and 191. A reference voltage KVC is supplied to one of the input terminals of the IRED driver circuit, and a feedback system for automatically adjusting an IRED current is provided so that the output of the addition circuit equals the voltage KVC.

The outputs Va and Vb are transmitted to a subtraction circuit, which is composed of an operational amplifier 175 and resistors 176 through 179, to obtain the output −(Va−Vb). This output is converted into a predetermined voltage by an inverting amplification circuit, which has an operational amplifier 184 and resistors 185 and 186, to provide a final correction system position output. The processing circuit shown in FIG. 4 is provided in both x and y axial directions in the same manner, and the outputs are used to perform feedback control of the correction optical system.

Referring again to FIG. 3, reference numeral 155 denotes charge pins. A lock mechanism 160 mechanically halts the movement of the correction system 9. In accordance with a current that flows across the magnet and the direction of its flow, a projection 163 of a mechanical lock member moves in the Z direction to perform locking/unlocking, and rapidly engages, or disengages, a recessed portion 164 that moves with the correction lens 154. Support balls 162 are swing & tilt stoppers to restrict the movement of a shifting system in a direction in which it may fall.

Figure 5:
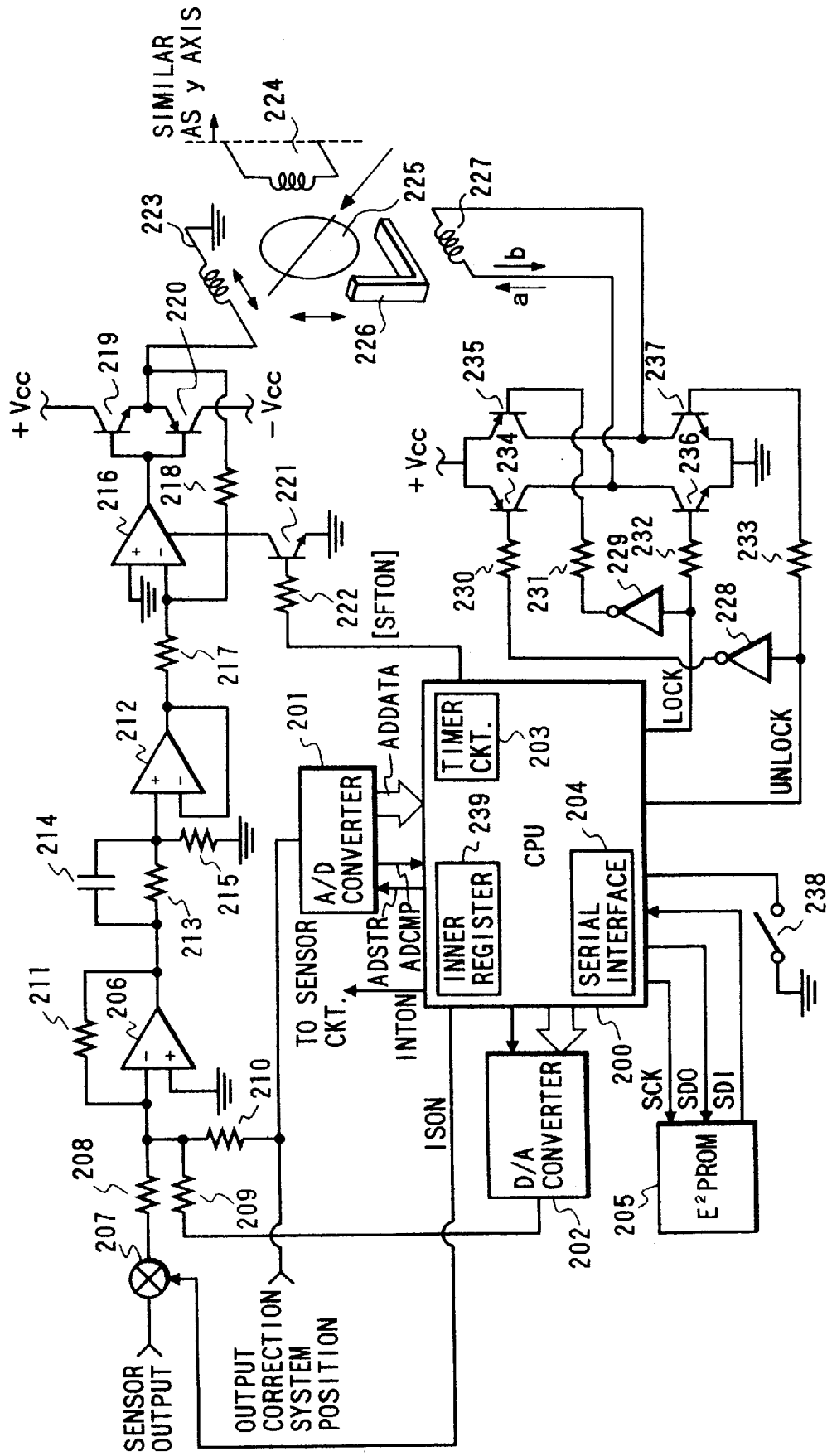
FIG. 5 is a specific circuit diagram illustrating the image blur prevention apparatus shown in FIG. 1.
Figure 6:
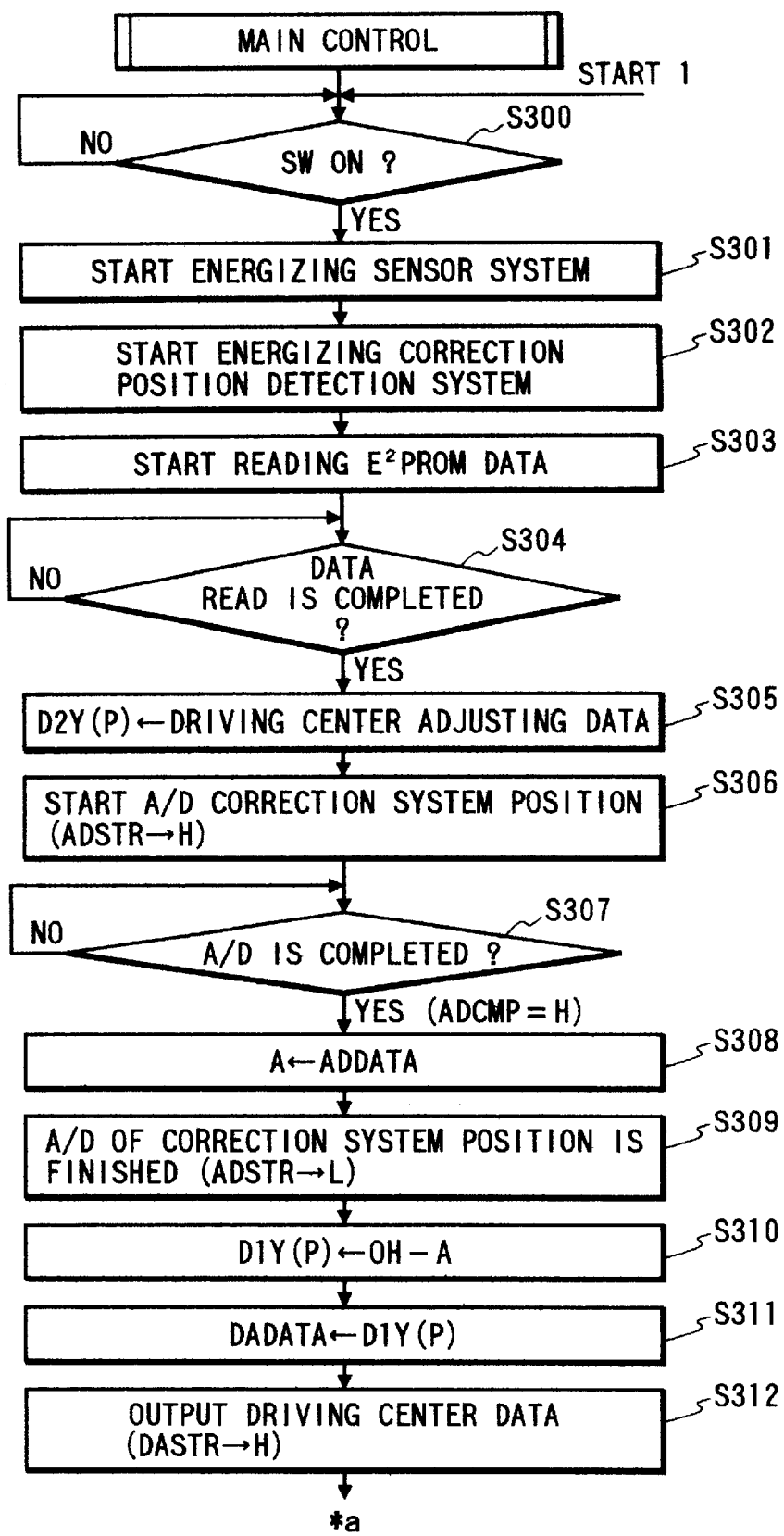
FIG. 6 is a flowchart of the processing for the locking release that is performed by the image blur prevention apparatus shown in FIG. 1.
Figure 7:
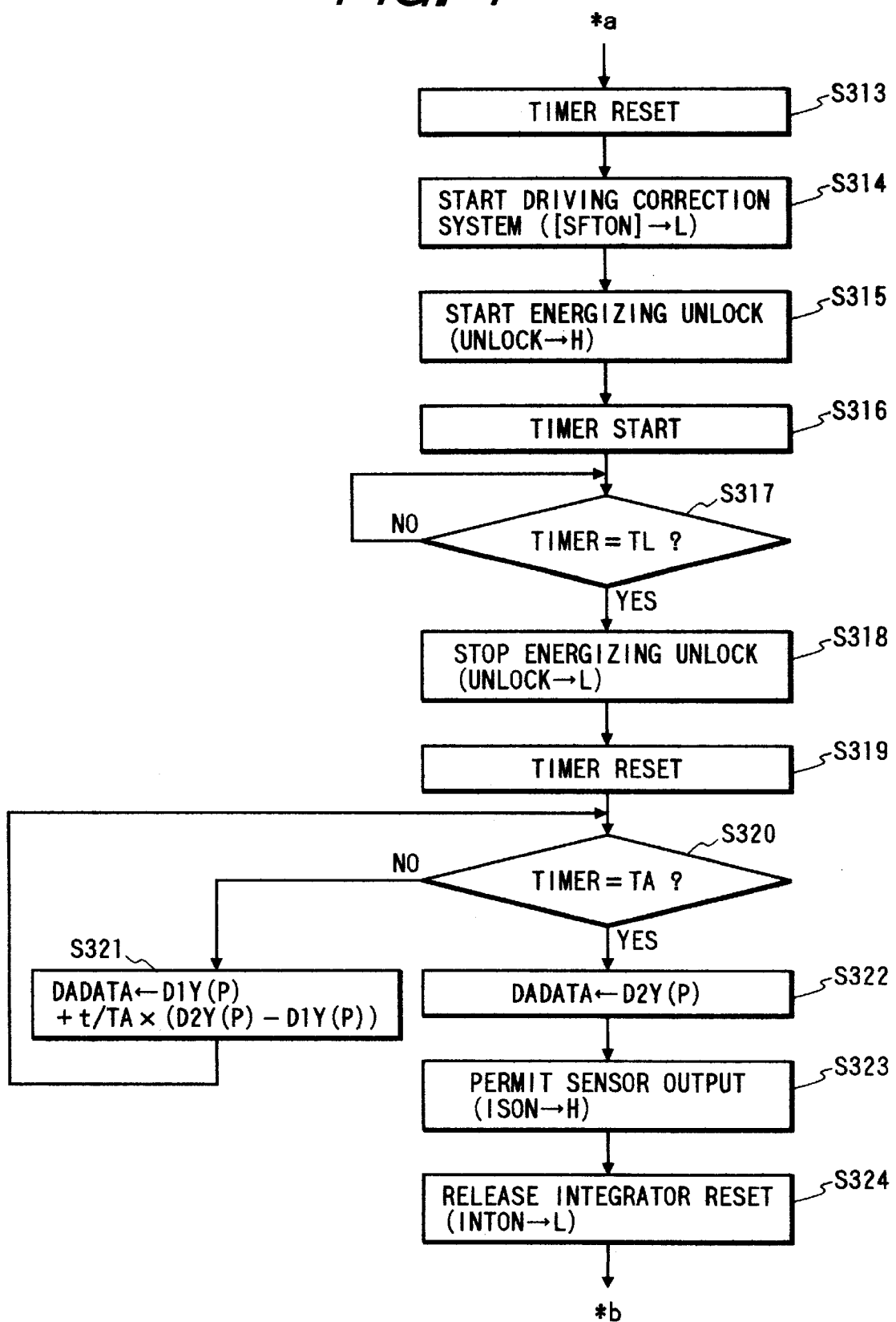
FIG. 7 is a flowchart of the image blur prevention processing performed by the image blur prevention apparatus shown in FIG. 1.
Figure 8:
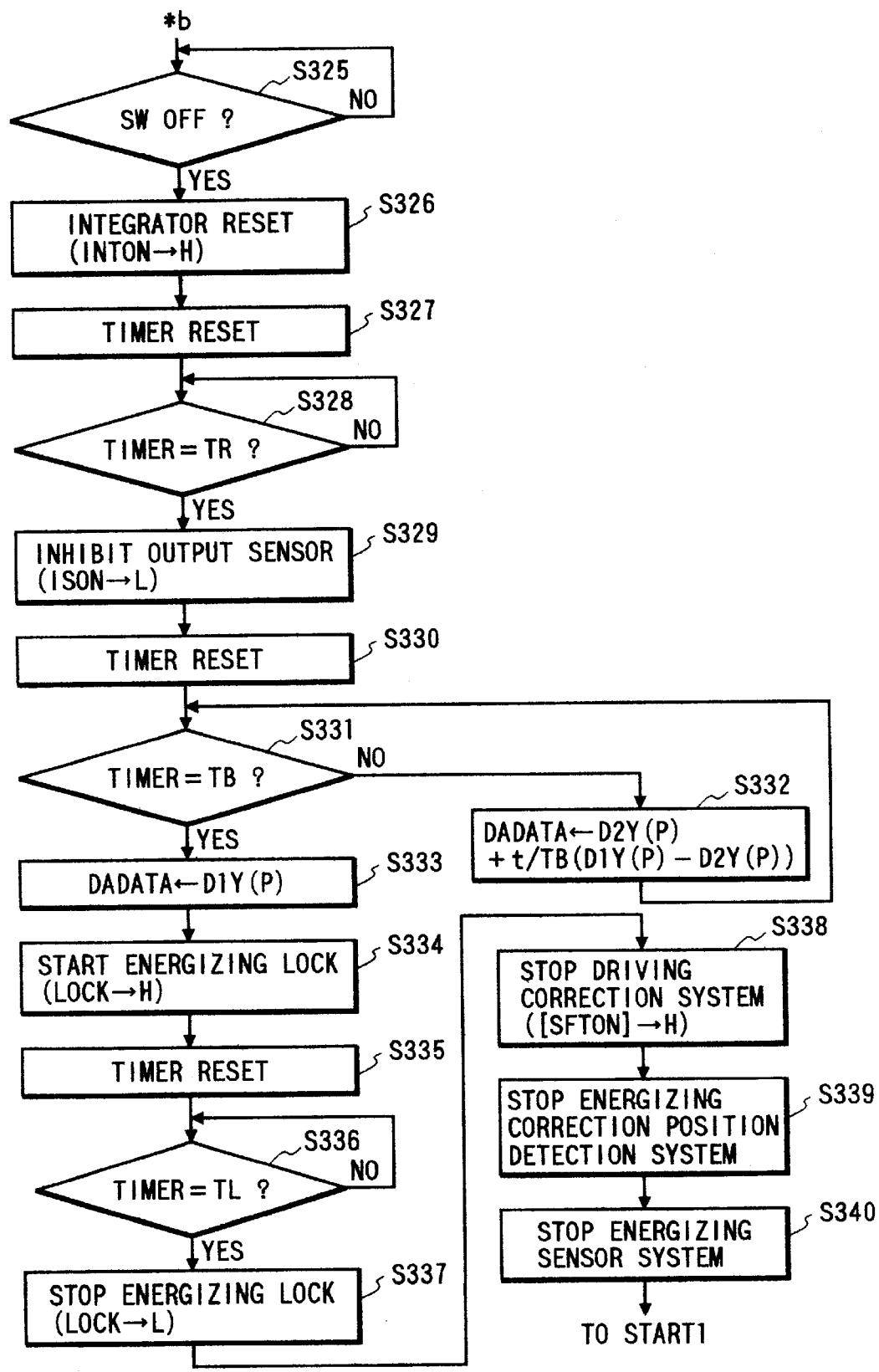
FIG. 8 is a flowchart of the processing for the image blur prevention apparatus shown in FIG. 1 that is performed at the time of locking.

FIG. 5 is an electric circuit diagram illustrating the image blur prevention apparatus shown in FIG. 1. FIGS. 6 through 8 are flowcharts of the processing that is performed by the image blur prevention apparatus shown in FIG. 1.

The actual processing will now be described while referring to FIGS. 5, and 6 through 8. First, FIG. 5 shows a specific circuit structure of the entire image blur prevention apparatus in the block diagram in FIG. 1, with the exception of the fluctuation sensor signal processing circuit shown in FIG. 2 and the correction system detection circuit shown in FIG. 4.

A CPU 200, for controlling the entire apparatus; an A/D converter 201, for reading correction system position output to the CPU 200; and a D/A converter 202, for outputting driving center correction data, correspond to the block A indicted by broken lines in FIG. 1.

The CPU 200 internally includes a timer circuit 203, for setting a mechanical locking time, which will be described later, and a time for changing driving center data; a serial interface circuit 204, for performing data communication with an E$^2$PROM 205 in which external adjustment data are stored; and an internal register 239, for temporarily storing results obtained by computation.

An ordinary addition circuit that is composed of an operational amplifier 206 and resistors 208 through 211 corresponds to the addition means 7 shown in FIG. 1. The addition circuit adds together the output of the fluctuation sensor 4, the positioning output of the correction system (the shifting system, etc.) and the driving center correction data output of the D/A converter 202. On the input side of the apparatus, an analog SW 207 is provided between the sensor output and the resistor 208, and is employed to selectively input/not input the sensor output to the addition circuit in accordance with control signal ISON from the CPU 200.

The output of the operational amplifier 206 is transmitted to a phase correction circuit that includes an operational amplifier 212, resistors 213 and 215 and a capacitor 214. This correction circuit improves the stability of the system by advancing the phase of a feedback loop so as to perform feedback control for the entire correction system.

Sequentially, the output of the operational amplifier 212 is transmitted to a power amplification circuit that consists of an operational amplifier 216, resistors 217 and 218 and transistors 219 and 220. The power is supplied to a driving coil 223 by the output of the power amplification circuit, and as is explained in the processing of the correction lens system, the shifting lens 225 is moved by driving power supplied by a predetermined magnetic circuit. Switch means that has a transistor 221 and a resistor 222 controls a driving circuit by using a [SFTON] signal from the CPU 200.

FIG. 5 shows the structure of the correction circuit relative to the movement in one axial direction (y axial direction). Since the structure of the correction circuit relative to the movement in the other direction, i.e., the movement in the x axial direction, is the same, no explanation for it will be given. The phase correction circuit and the power amplification circuit correspond to the correction system driving means 8 shown in FIG. 1.

An H bridge for which transistors 234 through 237 are used is a circuit that supplies to a driving coil 227, in a predetermined direction, a current having a predetermined strength. A locking mechanism for mechanically locking the shift lens 225 is operated by power that is supplied to the driving coil 227.

FIG. 6 is a flowchart of the processing performed by the image blur prevention apparatus shown in FIG. 1 before the locking is released. FIG. 7 is a flowchart of the image blur prevention processing for the image blur prevention apparatus shown in FIG. 1. FIG. 8 is a flowchart of the processing performed at the time of locking by the image blur prevention apparatus shown in FIG. 1.

The program control of the CPU 200 will now be described while referring to the flowcharts in FIGS. 6 through 8.

First, while referring to the flowcharts in FIGS. 6 and 7, an explanation will be given of the control exercised for starting the image blur prevention operation from the condition where the image blur prevention operation is halted (the correction system is locked). A check is performed to determine whether or not the SW 238, shown in FIG. 5, which a photographer manipulates to start image blur prevention, is in the ON state (S300). When the SW 238 is in the ON state, program control moves to S301. When the SW 238 is in the OFF state, program control returns to S300. Then, the fluctuation sensor and the fluctuation sensor processing circuit shown in FIG. 2 are energized (S301). Following this, the correction position detection circuit shown in FIG. 4 is energized (S302). In synchronization with serial synchronization clock SCK, the reading of adjustment data for individual lenses that are set in the E$^2$PROM 205 is begun by the CPU 200, via the serial interface 204 that is inside the CPU 200, along a serial reception line SDI (S303).

Then, a check is performed to determine whether or not all data have been read (S304). When the reading of all the data has been completed, as inherent lens data that were read from the E$^2$PROM 205, the driving center adjusting data are set for yaws and pitches in registers D2Y and D2P of the CPU 200 (S305). The driving center data that are stored in the E$^2$PROM 205 normally indicate values near the center of the optical axis, as is explained in FIG. 13, and in the design, these values are those that are positioned in the vicinity of the center of the play for the mechanical locking. In this embodiment, the stored driving center substantially corresponds to the center of the play for the mechanical locking. However, the driving center may be set so that it differs from the center of the play for the mechanical locking. The driving center location is determined by a support mechanism for the correction system shown in FIG. 3, and the driving center can be set so that the movable range for the correction system is centrally positioned.

When the CPU 200 changes an ADSTR signal to H for the A/D converter 201, the A/D converter 201 performs A/D conversion of the current correction system position output (S306). The state of the ADCMP signal (H indicates completion) output by the A/D converter 201 is examined to determine whether or not the A/D conversion has been completed (S307). The result is set in register A, inside the CPU 200, across data line ADDATA (S308). Since the reading operation for the correction system position output data is performed the same for both yaws and pitches, only the data reading for one of the axes has been explained.

When the ADSTR output becomes level L, the operation relative to the A/D converter 201 is halted (S309). Then, the current correction system position output value that was read by the A/D converter 201, and set in the register A inside the CPU 200, is subtracted from 0, i.e., the sign of the value is inverted and the result is set for yaws and pitches in registers D1Y and D1P of the CPU 200 (S310). The contents of the register are output to the D/A converter across line DADATA (S311). Thereafter, the output DASTR of the CPU 200 is changed to level H, and an analog output that corresponds to the DADATA is generated by the D/A converter 202 and transmitted to the previously described addition circuit (S312).

Program control then moves to the flowchart in FIG. 7.

The timer circuit 203 in the CPU 200 is reset (a timer count value is set to 0) (S313). Then, when the [SFTON] output of the CPU 200 is altered to level L and the transistor 221 is rendered off, the shifting system coil driving power amplification circuit, which includes the operational amplifier 216, etc., is set to the operating state (S314). Therefore, since at this time, the analog SW 207 is still in the OFF state, the output from the fluctuation sensor 4 is not added for the driving of the shifting system, and the correction system position output and the driving center set data from the D/A converter 202 are added together. In accordance with the result, it is determined to energize the shifting system driving coil 223 (the coil 224 for the pitches). At this time, the data having the inverted sign, the first shifting system position output, are set as the initial driving center data, as is described above. Thus, feedback control is performed so that the shifting driving circuit shown in FIG. 5 can hold the shifting system at a position that substantially is the initial position (the position in the locked state).

In this condition, when the UNLOCK output of the CPU 200 is changed to level H, the output of the inverter 228 becomes level L, and as a result, the transistor 234 is rendered on across the resistor 230 and the transistor 237 is rendered on across the resistor 233. Therefore, a current flows across the mechanical lock driving coil 227 in a direction indicated by an arrow a (S315). Consequentially, the mechanical lock 226 is unlocked by the shifting lens 225 and provides the lock released condition. At this time, feedback control has begun, so that the shifting system is halted at the initial locked state. Even when the locking is released, the shifting system is not greatly displaced, such as being dropped.

The timer circuit 203 of the CPU 200 is activated and begins the count (S316). A check is performed to determine whether or not a time TL, during which a current is supplied to the coil 227 until the UNLOCK process is completed, has elapsed (S317). When the time TL has elapsed, the UNLOCK output becomes L and the supply of the current to the coil 227 is halted (S318). Thereafter, the timer circuit 203 is reset (S319), and a check is performed to determine whether or not a timer count value has reached a predetermined time TA (S320).

When the timer count value has not reached the time TA, in order for the driving center data of the shifting system to be changed as time elapses, the result of either an expression, D1Y+t/TA×(D2Y−D1Y) or D1P+t/TA×(D2P−D1P), is sequentially transmitted to the D/A converter 202, across the DADATA line, until the timer count value equals the predetermined time TA (S321). It should be noted that in the expression D1Y (or D1P) denotes the value in the resistor in which are set data determined by the shifting system position in the initial locked state; t/TA is a ratio of a timer count value t to the predetermined time TA; and D2Y−D1Y (D2P−D1P) denotes the subtraction of D1Y (or DIP) from the register D2Y (or D2P) in which are set the center position correction data for the individual lenses.

Figure 11:
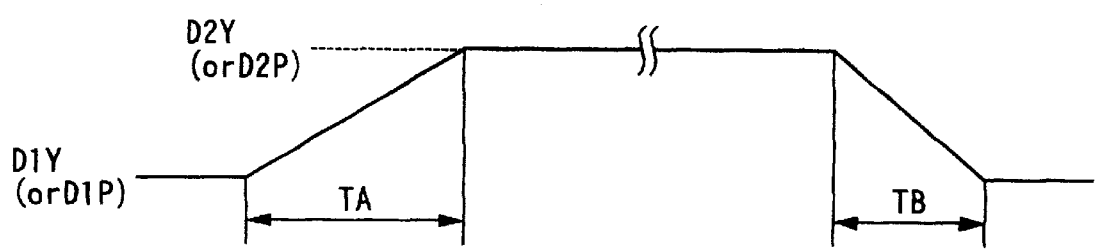
FIG. 11 is an explanatory diagram for time TA that is held by a timer shown in FIG. 7.
Figure 12:
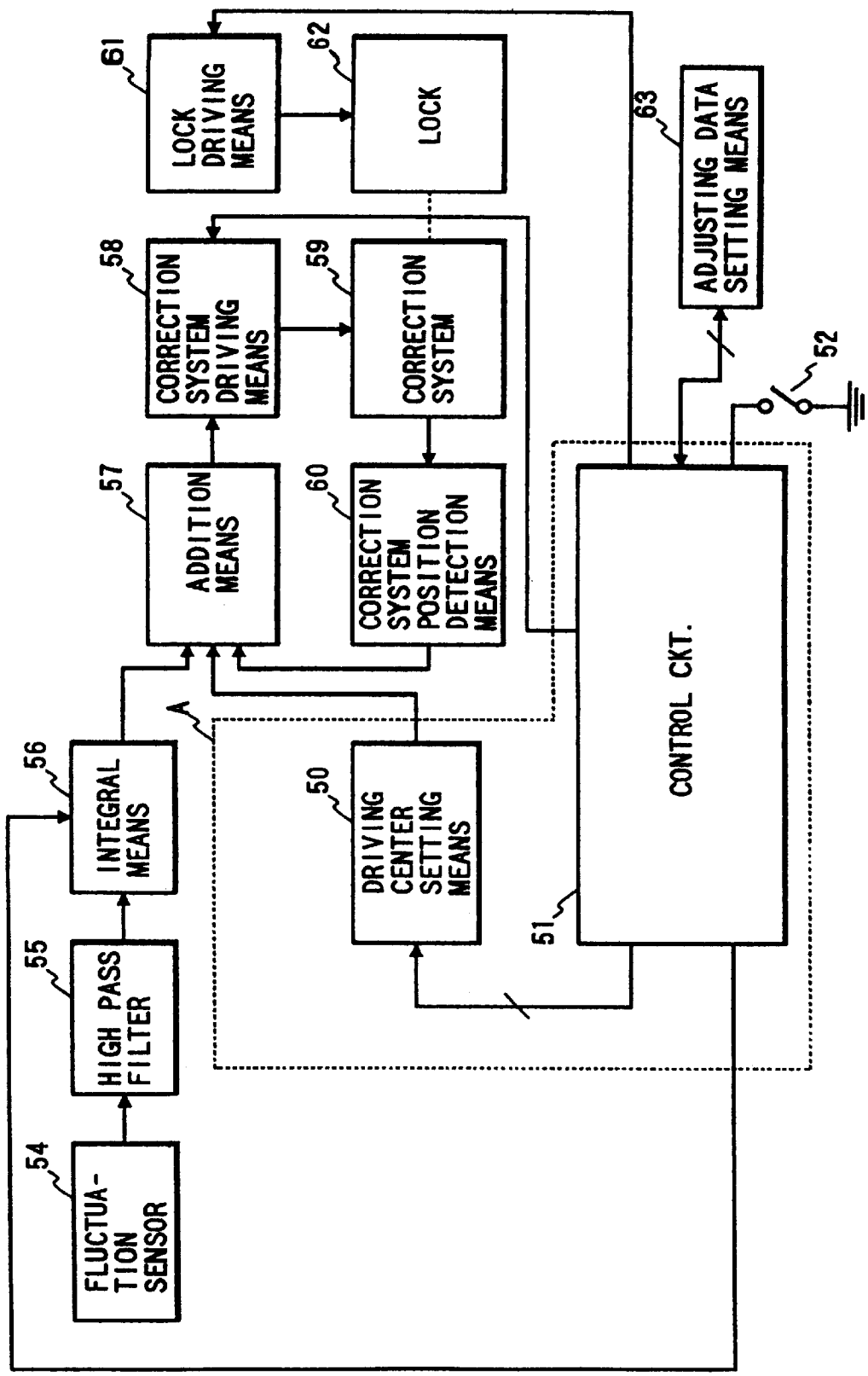
FIG. 12 is a diagram illustrating the general structure of a conventional image blur prevention apparatus.

Based on data from the CPU 200, the output of the D/A converter 202 is changed in proportion to the time until the voltage value corresponding to D1Y(P) equals the voltage value corresponding to D2Y(P), as is shown in the explanatory diagram in FIG. 11. The shifting system is gradually moved from the initial position before locking is released to the center of the actual optical axis of the lens.

When, as a result of the process at S320, the timer count has reached the time TA, the value of register D2Y (or D2P) is output across the DADATA line, with the following driving center data being maintained as a constant value. Thus, after the predetermined time TA has elapsed, the correction system is driven mainly in the vicinity of the optical axis (S322).

Then, since the ISON output of the CPU 200 becomes level H, the analog SW 207 is turned on and the sensor output is transmitted to the addition circuit, and the correction optical system 225 is driven in accordance with a fluctuation signal from the sensor (S323).

Following this, the INTON output of the CPU 200 becomes level L (this output is level H in the initial state), and the analog SW 112, which has short-circuited both ends of the capacitor of the integral circuit shown in FIG. 2, is turned off. The integral device goes into the operating state, and its output is changed to a signal that corresponds to the amount of movement of the hands of a photographer. When the time that is determined by the time constant of the integral device has elapsed, the correction system is driven to correct for image blurring, and the apparatus is set to the normal image blur prevention condition (S324).

The program control then moves to the flowchart in FIG. 8. The processing from the beginning of an image blur prevention condition to the halting of the image blur prevention will now be described.

A check is performed to determine whether or not the switch 238 shown in FIG. 5 is in the OFF state (S325). When the switch 238 is OFF, the INTON output of the CPU 200 becomes level H and the integral circuit shown in FIG. 2 is reset. Therefore, since at this moment the sensor output becomes independent of the fluctuation signal, the correction system is set and becomes stationary in the vicinity of the optical axis, based on the driving center data D2Y (or D2P) (by the 0-closed control that is unrelated to the sensor output) (S326).

The timer circuit 203 of the CPU 200 is then reset (S327), and a check is performed that uses the timer circuit 203 to determine whether or not a predetermined time TR has elapsed (S328). In other words, program control waits, since at S326 the integral device was reset until the correction system completes the correction for fluctuation. When the predetermined time TR has elapsed, the ISON output of the CPU 200 becomes level L, the SW 207 in FIG. 5 is turned off, and transmission of the sensor output to the correction system driving circuit is completely inhibited (S329).

After the timer circuit 203 is reset again (S330), a check is performed to determine whether or not a timer count value has equaled a predetermined time value TB (S331). When the timer count value has not yet reached the target value, in order for the driving center data of the shifting system to be changed as time elapses, in the period up until the timer count value has reached the predetermined value TB, the value held by the register D2Y (or D2P), in which data inherent to the individual lenses are set, is added to a value that is obtained by multiplying D1Y (or D1P)–D2Y (or D2P) by t/TB, which is the ratio of the timer count value t to the predetermined time value TB, and the resultant value is sequentially transmitted to the D/A converter 202 across the DADATA line (S332).

As is shown in FIG. 11, based on the data from the CPU 200, the output of the D/A converter 202 is changed in proportion to the time that has elapsed until the voltage value corresponding to D2Y (or D2P) equals the voltage value corresponding to D1Y (or D1P). The shifting system is therefore gradually moved from the substantially center optical axis position to the initial position before the locking was released, as is shown by TB in FIG. 11.

When, as the result of the determination at S331, it is found that the timer count value has reached the predetermined time value TB, finally, the value of the driving center data D1Y (or D1P), which corresponds to the initial position data before the locking was released, is transmitted across the DADATA line and via the D/A converter 202 to the shifting system control circuit in FIG. 5 (S333). The shifting system is then placed in the initial position before the locking was released.

When, under these conditions, the LOCK output of the CPU 200 becomes level H, the transistor 235 is rendered ON via the inverter 229 and the resistor 231, and at the same time, the transistor 236 is rendered ON across the resistor 232. A current therefore flows across the mechanical locking driving coil 227, in a direction indicated by an arrow b, and the locking member 226 begins to move toward the locked position (S334).

After the timer circuit 203 of the CPU 200 has been reset (S335), a check is performed to determine whether or not a timing TL, which is required for activation of the locking member 226, has elapsed (S336). When the timing TL has elapsed, the supply of the current for the locking process is halted (S337).

Sequentially, the [SFTON] output of the CPU 200 becomes level H and the transistor 221 is rendered on via the resistor 222, the shifting system driving circuit, which includes the operational amplifier 216, is rendered off, and the driving of the shift correction system is halted (S338). Further, the energizing of the correction position detection system is halted (S339), and the energizing of the sensor system is also halted (S340). When all the processing has been completed, program control returns to the start.

As is described above, in this embodiment, simultaneous driving of the correction optical system and the mechanical locking release is avoided. The initial position data D1Y (D1P) for the correction system, and the driving center set data D2Y (D2P) are set to inhibit the sensor output. The driving center is so controlled that it is changed gradually. As is shown for the time TA in FIG. 11, when the locking of the correction system is released, the driving center is gradually moved from the initial position, before the locking has been released, toward the actual optical axial center of the lens, while as is shown for the time TB in FIG. 11, when the correction system is locked, the driving center is gradually moved from the optical axial center position to the initial position, before the locking has been released. As a result, the problem of instability of the mechanical locking is resolved.

(Second Embodiment)

A second embodiment of the present invention will now be described while referring to the accompanying drawings.

Figure 9:
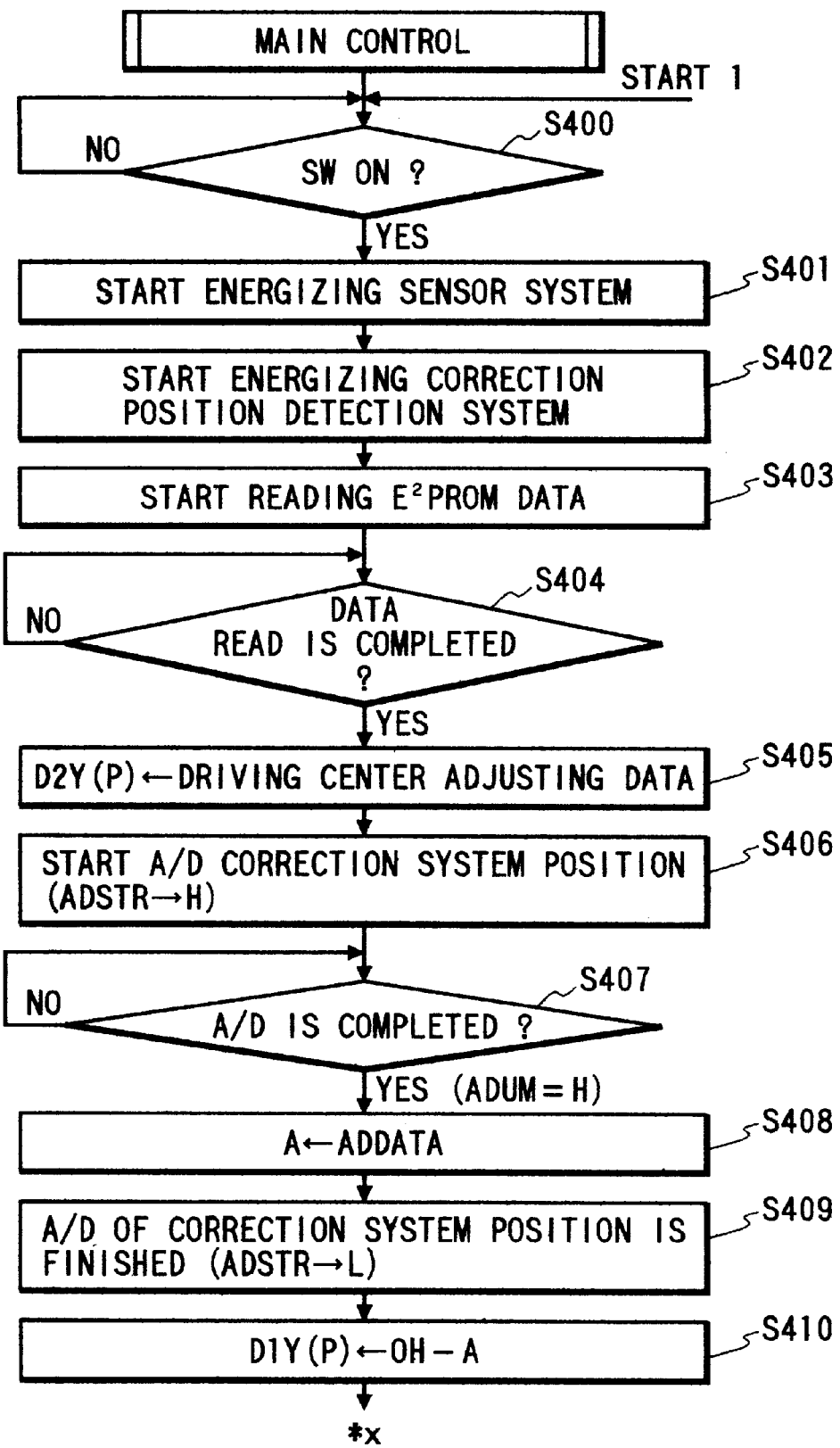
FIG. 9 is a flowchart of the processing, according to a second embodiment of the present invention, for an image blur prevention apparatus before the locking is released.
Figure 10:
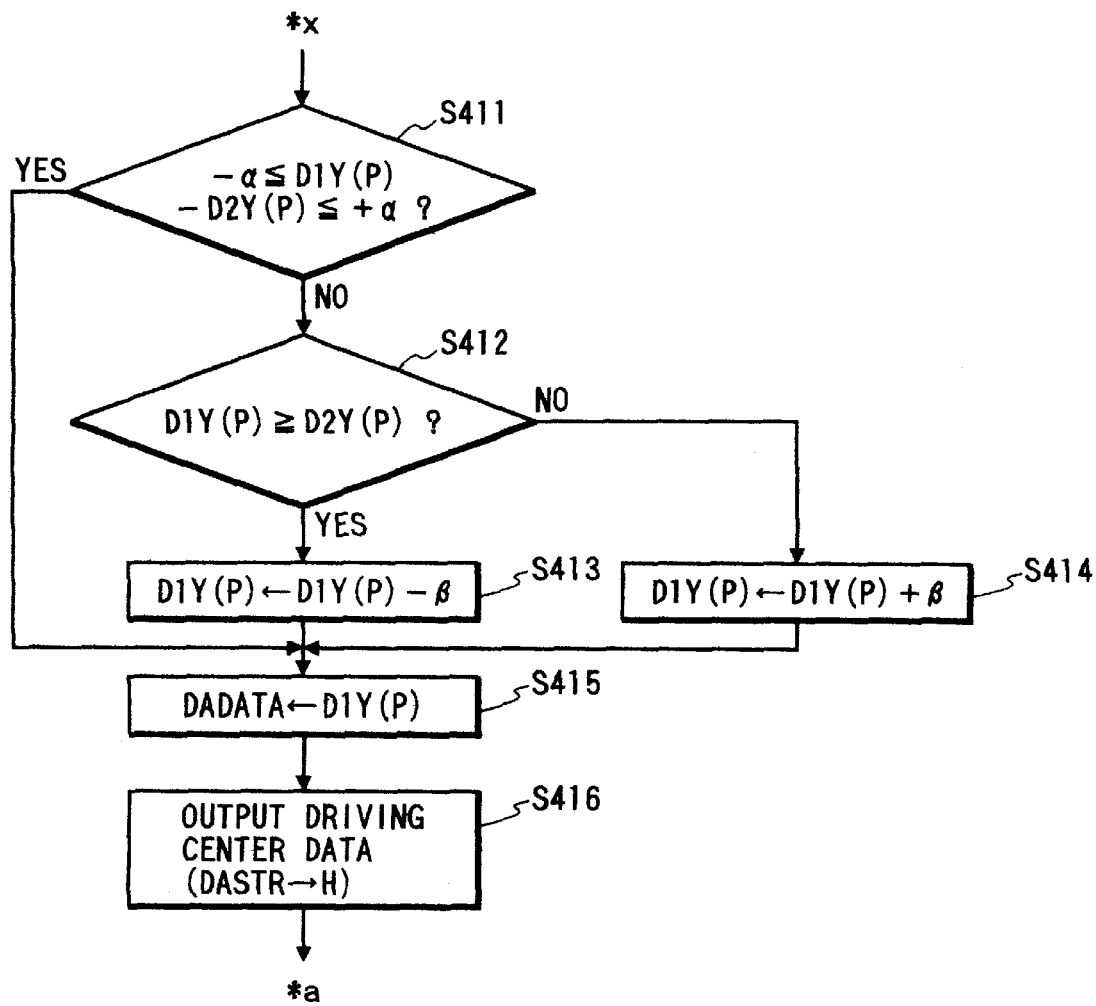
FIG. 10 is a flowchart of the processing, according to the second embodiment of the present invention, for changing the setting of the driving center data.

FIG. 9 is a flowchart of the processing for an image blur prevention apparatus according to the second embodiment of the present invention. FIG. 10 is a flowchart of the processing for changing the setting of driving center data according to the second embodiment of the present invention.

The general structure shown in FIG. 1 and the circuits shown in FIG. 5 are also applied for the second embodiment.

First, in FIG. 9, the process at S400, for determining whether or not the switch 238 in FIG. 5 is turned ON, through the process at S410, for temporarily setting to D1Y (or D1P) a reference value of the driving center data of the shift correction system, which moves from its initial position when the locking is released, are the same as those at S300 through S310 in the first embodiment. An explanation for them will not therefore be given, and only the processes in FIG. 10 that are different will be described.

A check is performed to determine whether or not a difference between initial driving center data D1Y (or D1P), which is determined by the position of the shifting system before the locking is released, and adjusting data D2Y (D2P), which are required for positioning the shifting system substantially near the optical axis, including the variance in the power of individual lenses, falls within the range reaching from predetermined value −α to predetermined value +α (S411). More specifically, when a value of the first driving center data, which is determined by the position of the initial correction system (the position in the locked state), is very near a value of the second driving center data, which is original image blur prevention center data used to position the shifting system near the optical axis (i.e., value α is very small), no special correction is made for the first driving center data that are determined by the first position of the shifting system, and the value of the D1Y (or D1P) obtained at S410 is transmitted across a DADATA line to a D/A converter 202. The driving center data for the shifting system when the release of mechanical locking is begun are set (S415).

When, at S411, a difference between D1Y (or D1P) and D2Y (or D2P) does not fall within the range extending from the predetermined value −α to the predetermined value +α, i.e., when the value of the first driving center data that is determined from the first position of the correction system differs greatly from the value of the second driving center data for positioning the shifting system near the optical axis, a check is performed to determine which is greater, D1Y (or D1P) or D2Y (or D2P) (S412). When the value of D1Y (or D1P) is equal to or greater than the value of D2Y (or D2P), the result obtained by subtracting predetermined data p from the value of D1Y (or D1P) is set again as D1Y (or D1P) (S413). When the value of D1Y (or D1P) is smaller than the value of D2Y (or D2P), the result obtained by adding predetermined data β to the value of D1Y (or D1P) is set again as the D1Y (or D1P) (S414).

Since the image blur prevention and locking processes performed at S416 and the following steps are the same as those performed at S313 through S340 in the first embodiment, no explanation for them will be given.

Figure 13:
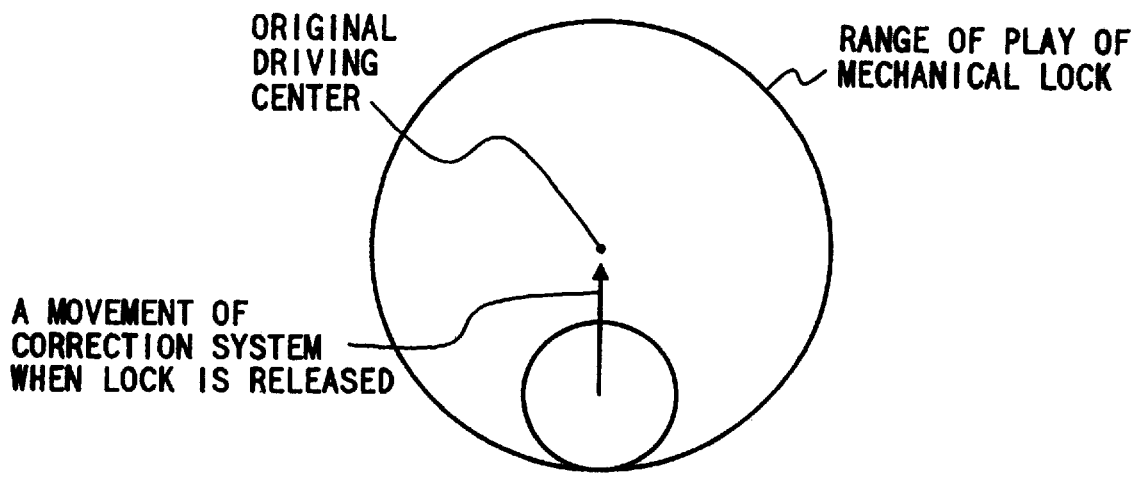
FIG. 13 is a specific diagram illustrating the range of movement of the play for the mechanical locking of a correction system shown in FIG. 12.

If the driving center data for the correction system are set only by referring to the position of the shifting system before the release of the mechanical locking, the shifting system is actually positioned outside of the range of the mechanical play, as is shown in FIG. 13, due to steady a deviation of the shifting system position, which is caused by a current being supplied by which the shifting system is automatically maintained when the feedback control is actually performed. If the driving center is determined only by the shifting system position before it is energized, when the feedback control for the shifting system is actually begun, the driving force of the shifting system will act in the direction in which mechanical play is extended, and as a result, the release of the mechanical locking will be prevented. As is described above, therefore, according to this embodiment, in the processes at S413 and S414, the driving center data of the shifting system when the mechanical locking is released is set in advance to a value that, by a predetermined value β, is near the final driving center data for the image blur prevention. When the shifting system is gradually moved from the set value to the final driving center, stability upon the release of the mechanical locking is improved more.

While the present invention has been described with respect to what is presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

In addition, the individual components shown in schematic or block form in the Drawings are all well-known in the camera arts, and their specific construction and operation are not critical to the operation, or the best mode for carrying out the invention.

The present invention may be carried out by combining the above embodiments or technical elements, as needed.

The present invention may be realized by all, or a part, of the structure recited in claims or the embodiments forming one apparatus, or being coupled with another apparatus, or serving as components of an apparatus.

The present invention can be applied to various types of cameras, such as single-lens reflex cameras, lens-shutter cameras and video cameras, other optical devices and devices that are applied for these cameras, other optical devices and other types of devices, or components that constitute these devices.

What is claimed is:

1. An image blur prevention apparatus comprising:
   a movable member which moves for image blur prevention;
   a holding device which holds said movable member, said holding device being changeable between a state in which a predetermined holding operation is performed and a state in which the predetermined holding operation is not performed;
   an operating device which operates said movable member for image blur prevention at a predetermined position as a control center position; and
   a control device which controls movement of said movable member between a holding position of said holding device and the predetermined position, said control device controlling a process of the movement between the holding position and the predetermined position.

2. An image blur prevention apparatus according to claim 1, wherein said control device includes means for controlling a position of said movable member during a process by which said movable member is moved between the holding position and the predetermined position.

3. An image blur prevention apparatus according to claim 1, wherein said control device includes means for controlling, step by step, the movement of said movable member when said movable member is to be moved between the holding position and the predetermined position.

4. An image blur prevention apparatus according to claim 1, wherein said operation device includes means for operating said movable member in accordance with an image blur state.

5. An image blur prevention apparatus according to claim 4, wherein said operation device includes means for operating said movable member in accordance with a signal that corresponds to the image blur state.

6. An image blur prevention apparatus according to claim 4, wherein said operation device includes means for operating said movable member in accordance with the image blur state so that said movable member is positioned at the predetermined position when image blur does not occur.

7. An image blur prevention apparatus according to claim 1, wherein said holding device includes means for holding said movable member by a mechanical operation.

8. An image blur prevention apparatus according to claim 1, wherein said operation device includes means for operating said movable member by using a movable range center position of said movable member as the control center position.

9. An image blur prevention apparatus according to claim 1, wherein said movable member includes an optical member.

10. An image blur prevention apparatus according to claim 9, wherein said operation device includes means for operating said movable member by employing a position at which an optical axis of said optical member substantially corresponds to an optical axis of another optical system as the control center position.

11. An image blur prevention apparatus according to claim 1, wherein said control device includes means for moving said movable member from the holding position to the predetermined position when said holding device releases the holding.

12. An image blur prevention apparatus according to claim 1, wherein said control device includes means for moving said movable member from the predetermined position to the holding position when said holding device starts the holding.

13. An apparatus adapted for an image blur prevention device that includes a movable member which moves for image blur prevention, a holding device which holds the movable member, the holding device being changeable between a state in which a predetermined holding operation is performed and a state in which the predetermined holding operation is not performed and an operation device which operates the movable member for image blur prevention at a predetermined position as a control center position, said apparatus comprising:
   a control device which controls movement of the movable member between a holding position of the holding device and the predetermined position, said control device controlling a process of the movement between the holding position and the predetermined position.

14. An optical apparatus comprising:
a movable member which moves for image blur prevention;
a holding device which holds said movable member, said holding device being changeable between a state in which a predetermined holding operation is performed and a state in which the predetermined holding operation is not performed;
an operating device which operates said movable member for image blur prevention at a predetermined position as a control center position; and
a control device which controls movement of said movable member between a holding position of said holding device and the predetermined position, said control device controlling a process of the movement between the holding position and the predetermined position.

15. A camera comprising:
a movable member which moves for image blur prevention;
a holding device which holds said movable member, said holding device being changeable between a state in which a predetermined holding operation is performed and a state in which the predetermined holding operation is not performed;
an operating device which operates said movable member for image blur prevention at a predetermined position as a control center position; and
a control device which controls movement of said movable member between a holding position of said holding device and the predetermined position, said control device controlling a process of the movement between the holding position and the predetermined position.

16. An image blur prevention apparatus according to claim 1, wherein said holding device includes means for regulating the movement of said movable member so that said movable member is movable in a smaller range than the movable range for the image blur prevention.

17. An image blur prevention apparatus according to claim 1, wherein said holding device includes means for abutting a portion of said movable member to hold the movable member.

18. An image blur prevention apparatus comprising:
a movable member which moves for image blur prevention;
a holding device which holds said movable member, said holding device being changeable between a state in which a predetermined holding operation is performed and a state in which the predetermined holding operation is not performed;
an operating device which operates said movable member for image blur prevention at a predetermined position as a control center position; and
a control device which controls movement of said movable member between a holding position of said holding device and the predetermined position.

19. An image blur prevention apparatus comprising:
a movable portion, which moves for image blur prevention;
a holding device, which holds said movable portion mechanically, said holding device being changeable between a state in which a holding operation is performed and a state in which a holding operation is not performed;
a position detection device, which detects a position of said movable portion;
an operating device, which operates said movable portion, said operating device performing a first operation that holds said movable portion at a holding position determined in accordance with an output of said position detection device in a state in which said holding device performs said holding operation, and a second operation that operates said movable portion for causing an image blur prevention operation around a predetermined control center position, in accordance with a fluctuation signal representing a fluctuation state detected by a fluctuation detection device; and
a controller, which controls movement of said movable portion between the holding position in the first operation and the predetermined position in the second operation.

20. An apparatus according to claim 19, wherein said controller controls movement of said movable portion.

21. An apparatus according to claim 19, wherein said operating device receives an operation signal for operating said operating device, the operation signal varying stepwisely during movement of said movable portion.

22. An apparatus according to claim 19, wherein said controller controls movement of said movable portion stepwisely, responsive to a count of a timer.

23. An apparatus according to claim 19, wherein, when the fluctuation signal is a value indicating that the fluctuation is zero during the second operation, said movable portion is positioned at the predetermined position.

24. An apparatus according to claim 19, wherein said controller comprises a memory for memorizing data corresponding to the predetermined position, and the second control is performed in accordance with the memorized data.

25. An apparatus according to claim 24, wherein said memory comprises an EEPROM.

26. An apparatus according to claim 19, wherein said holding device comprises means for regulating the movement of said movable portion, so that said movable portion is movable in a smaller range than a movable range for the image blur prevention.

27. An apparatus according to claim 19, wherein said holding device comprises means for abutting a portion of said movable portion to hold the movable portion.

28. An apparatus according to claim 19, wherein said controller moves said movable portion from the holding position to the predetermined position when a state in which said holding device performs the holding operation becomes a state in which said holding device releases the holding operation.

29. An apparatus according to claim 19, wherein said controller moves said movable portion from the predetermined position to the holding position when a state in which said holding device does not perform the holding operation becomes a state in which said holding device performs the holding operation.

30. An apparatus according to claim 19, wherein said movable member comprises means for correcting an image blur.

31. An apparatus according to claim 19, wherein said movable member comprises an optical member.

32. An apparatus according to claim 31, wherein said optical member moves in a direction substantially perpendicular to a light axis.

33. An apparatus according to claim 31, wherein said optical means deflects a light beam.

34. An apparatus according to claim 19, wherein the fluctuation detection device includes a vibrating gyroscope.

35. An image blur prevention apparatus comprising:
a movable portion, which moves for image blur prevention;
an operating device, which operates said movable portion;
an energizing controller, which controls energization to said operating device, said energizing controller being changeable between a first state in which the energization is performed in accordance with first movable range center setting data and a second state in which the energization is performed in accordance with second movable range center setting data different from the first movable range center setting data; and
a changing controller, which changes the movable range center setting data stepwisely from one of the first and second movable range center setting data to another, responsive to an elapsed time when a changing operation is being performed between the first state and the second state.

36. An apparatus according to claim 35, wherein said energizing controller comprises means for determining the first movable range center setting data responsive to an output of a position detecting device for detecting a position of said movable portion.

37. An apparatus according to claim 36, further comprising a holding device which holds said movable portion mechanically, wherein said energizing controller comprises means for determining the first movable range center setting data responsive to an output of said position detecting device in a state in which said holding device holds said movable portion.

38. An apparatus according to claim 35, wherein said energizing controller causes said movable portion to perform the image blur prevention operation around a position determined by the second movable range center setting data as the movable range center.

39. An apparatus according to claim 38, wherein said energizing controller comprises means for causing said movable portion to perform an operation responsive to a fluctuation signal in accordance with a detection output of a fluctuation detection device around a position determined by the second movable range center setting data as the movable range center.

40. An apparatus according to claim 39, wherein said energizing controller comprises means for causing said movable portion to perform an operation responsive to data obtained by an addition of the second movable range center setting data and the fluctuation signal.

41. An apparatus according to claim 40, wherein the fluctuation detection device includes a vibrating gyroscope.

42. An apparatus according to claim 35, wherein said energizing controller comprises a memory for memorizing the second movable range center setting data.

43. An apparatus according to claim 42, wherein said memory comprises an EEPROM.

44. An apparatus according to claim 35, further comprising a holding device, which holds said movable portion mechanically, wherein said energizing controller comprises means for performing a change from the first state to the second state when a state in which said holding device performs the holding operation becomes a state in which said holding device releases the holding operation.

45. An apparatus according to claim 35, further comprising a holding device, which holds said movable portion mechanically, wherein said energizing controller comprises means for performing a change from the first state to the second state when a state in which said holding device does not perform the holding operation becomes a state in which said holding device performs the holding operation.

46. An apparatus according to claim 35, wherein said movable portion comprises means for correcting the image blur.

47. An apparatus according to claim 35, wherein said movable portion comprises an optical member.

48. An apparatus according to claim 47, wherein said optical member moves in a direction substantially perpendicular to a light axis.

49. An apparatus according to claim 47, wherein said optical means deflects a light beam.

* * * * *

UNITED STATES PATENT AND TRADEMARK OFFICE
CERTIFICATE OF CORRECTION

PATENT NO.    : 6,122,448
DATED         : September 19, 2000
INVENTOR(S)   : Yasuhiko Shiomi It is certified that error appears in the above-identified patent and that said Letters Patent is hereby corrected as shown below:

<u>Title page,</u>
Before Item [56], References Cited, insert:

-- [*] Notice:  This patent issued on a continued prosecution application filed under 37 CFR 1.53(d), and is subject to the twenty year patent term provisions of 35 U.S.C. 154(a)(2). --

<u>Column 3,</u>
Line 17, "example" should read -- example, --.

<u>Column 5,</u>
Line 43, "indicted" should read -- indicated --.

<u>Column 8,</u>
Line 17, "DIP) from" should read -- DIP) from --.

<u>Column 10,</u>
Line 60, "data p" should read -- data $\beta$ --.

Signed and Sealed this

Thirteenth Day of May, 2003

JAMES E. ROGAN
*Director of the United States Patent and Trademark Office*